United States Patent
Schütz

(10) Patent No.: US 6,616,180 B2
(45) Date of Patent: Sep. 9, 2003

(54) VEHICLE STEERING WHEEL

(75) Inventor: Dominik Schütz, Waldaschaff (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 10/083,072

(22) Filed: Feb. 26, 2002

(65) Prior Publication Data

US 2002/0125698 A1 Sep. 12, 2002

(30) Foreign Application Priority Data

Mar. 6, 2001 (DE) ..................... 201 03 890 U

(51) Int. Cl.⁷ .............................................. B60R 21/16
(52) U.S. Cl. ..................... 280/731; 200/61.55
(58) Field of Search ................. 280/731, 728.2; 200/61.55, 61.54

(56) References Cited

U.S. PATENT DOCUMENTS

| | | | |
|---|---|---|---|
| 5,303,952 A | * 4/1994 | Shermetaro et al. | ........ 280/731 |
| 6,062,592 A | 5/2000 | Sakurai et al. | |
| 6,147,315 A | * 11/2000 | Rudolph et al. | ......... 200/61.55 |
| 6,183,005 B1 | * 2/2001 | Nishijima et al. | .......... 280/731 |
| 6,312,012 B1 | * 11/2001 | Bohn et al. | .................. 280/731 |
| 6,437,265 B1 | * 8/2002 | Kreuzer | .................... 200/61.54 |
| 6,453,769 B2 | * 9/2002 | Sakurai | ....................... 74/552 |

FOREIGN PATENT DOCUMENTS

DE 19914653 C1 7/2000

OTHER PUBLICATIONS

Pending U.S. Schutz Patent Application Ser. No. 09/877,972, filed Jun. 8, 2001, entitled Multifunctional Steering Wheel, Attorney Docket No. TRW(ASG)5854.

* cited by examiner

Primary Examiner—Peter C. English
(74) Attorney, Agent, or Firm—Tarolli, Sundheim, Covell & Tummino L.L.P.

(57) ABSTRACT

The invention relates to a vehicle steering wheel comprising a steering wheel body and a gas bag module provided with two or more guide pins. The gas bag module, for actuation of a horn, is displaceably mounted in an axial direction by means of the guide pins. The steering wheel further comprises at least one multifunctional switch unit for the remote actuation of specific vehicle functions. The at least one multifunctional switch unit is mounted on the guide pins of the gas bag module so as to be movable in the axial direction independently of the gas bag module.

10 Claims, 4 Drawing Sheets

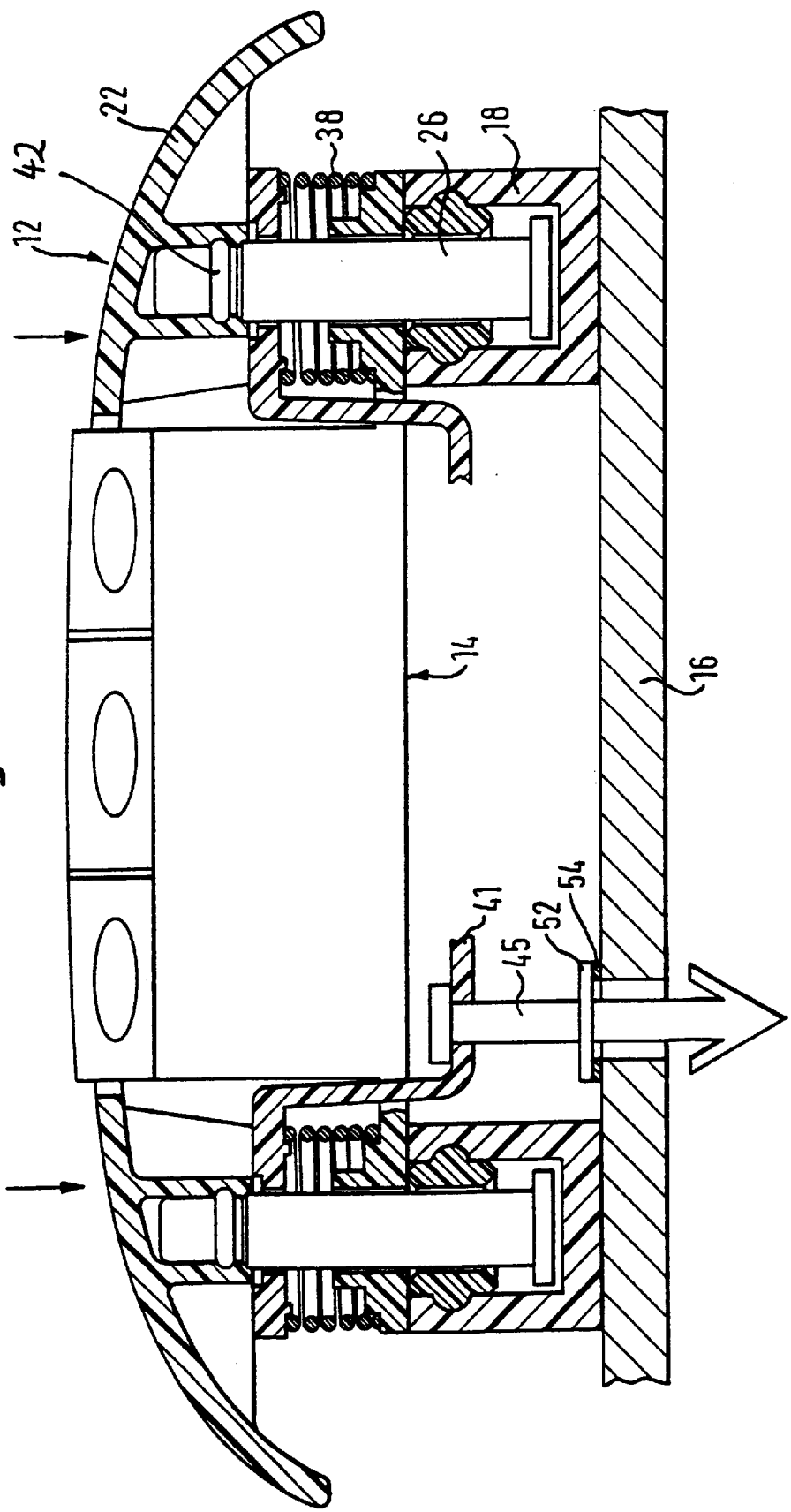

VEHICLE STEERING WHEEL

TECHNICAL FIELD

The invention relates to a vehicle steering wheel.

BACKGROUND OF THE INVENTION

Known vehicle steering wheels comprise a steering wheel body, a gas bag module provided with two or more guide pins, the gas bag module for actuation of a horn being displaceably mounted in an axial direction by means of the guide pins, and at least one multifunctional switch unit for the remote actuation of specific vehicle functions. A majority of such vehicle steering wheels which have been used in the meantime has a so-called floating horn gas bag module. This is a module mounted on the steering wheel body so as to be movable in the axial direction (axial direction means in the direction of the steering shaft), which is displaced for actuation of the horn. Alongside the module, multifunctional switch units are to be found increasingly frequently, which are likewise mounted on the steering wheel body or on the module. As through the actuation of the multifunctional switch a force is exerted onto the switch unit and the latter is arranged close to the module, it must be avoided that with the multifunctional switch actuation, an actuation of the horn occurs inadvertently. Vehicle functions which are operated remotely by the multifunctional switches are, for example, the speedomat, radio, telephone and the like, but not the horn, which is in fact to be triggered by pressing down the module.

BRIEF SUMMARY OF THE INVENTION

The invention provides a vehicle steering wheel in which the multifunctional switch unit and the gas bag module are uncoupled with regard to movement in a simple manner so that an inadvertent actuation of the horn on utilization of the multifunctional switch can be ruled out. This is achieved in a vehicle steering wheel which comprises a steering wheel body and a gas bag module provided with two or more guide pins. The gas bag module, for actuation of a horn, is mounted displaceably in an axial direction by means of the guide pins. The steering wheel further comprises at least one multifunctional switch unit for the remote actuation of specific vehicle functions. The at least one multifunctional switch unit is mounted on the guide pins of the gas bag module so as to be movable in the axial direction independently of, i.e. uncoupled from the gas bag module. Thus, according to the invention the guide pins of the module are themselves used for fastening the multifunctional switch unit, so that the guide pins have a dual function. A positive side-effect here is that the gap between the module and the multifunctional switch unit adjoining it can be kept constant and small. In a vehicle steering wheel according to the invention, therefore, no great structural effort is to be made for the uncoupling of the multifunctional switch unit and the gas bag module.

According to the preferred embodiment, the module and the multifunctional switch unit form a preassembled unit and can, therefore, be fastened as a unit to the steering wheel body, which keeps the positional tolerances small.

The preassembled unit is preferably formed in that the module and the multifunctional switch unit are connected with each other via the guide pins, whereby hitherto required support sheets for the preassembled unit can be completely dispensed with.

If the guide pins are also moved on actuation of the module, the position of the multifunctional switch unit can be established by a spring, so that also a defined friction between the guide pins and the multifunctional switch unit can not lead to the moving of the module or of the multifunctional switch unit, depending on which of the two parts is actuated. The spring is in fact arranged such that it presses the multifunctional switch unit into its mounting position.

For this, the springs are preferably arranged between the module and the multifunctional switch unit, the spring being able to serve, at the same time, for restoring the module after completion of the horn actuation.

An embodiment makes provision that the guide pins are fastened in the module and have a stop provided remotely from the fastening in the gas bag module. Between the module and the stop, the multifunctional switch unit is then displaceably mounted on the guide pins, so that without further structural effort the multifunctional switch unit is prevented from detaching itself from the module when both parts are still forming a preassembled unit, i.e. are not yet fastened to the steering wheel body.

It is also conceivable that bearing bushes are arranged on the guide pins, which bearing bushes are pressed into receptacles in the steering wheel body during mounting the preassembled unit into position, so that bearing bushes do not even have to be mounted in the steering wheel body before the installation of the unit. Preferably, the bearing bushes are pressed into a region of the steering wheel body which is encased in foam, which ensures a defined flexibility of the mounting. The bearing bushes can also be formed by the multifunctional switch unit itself.

Particularly when the bearing bushes are pressed into a foamed region, the entire unit must be prevented from being able to be easily removed again from the steering wheel body. For this, a snap connection can be used between the module and the steering wheel body, which at the same time can serve as an axial stop of the module. This means that the snap connection also defines the stop in the basic position with the horn not being actuated.

BRIEF DESCRIPTION OF THE DRAWINGS

FIG. 4 shows a section according to FIG. 3, with the horn actuated.

DETAILED DESCRIPTION OF THE PREFERRED EMBODIMENT

Figure 1:
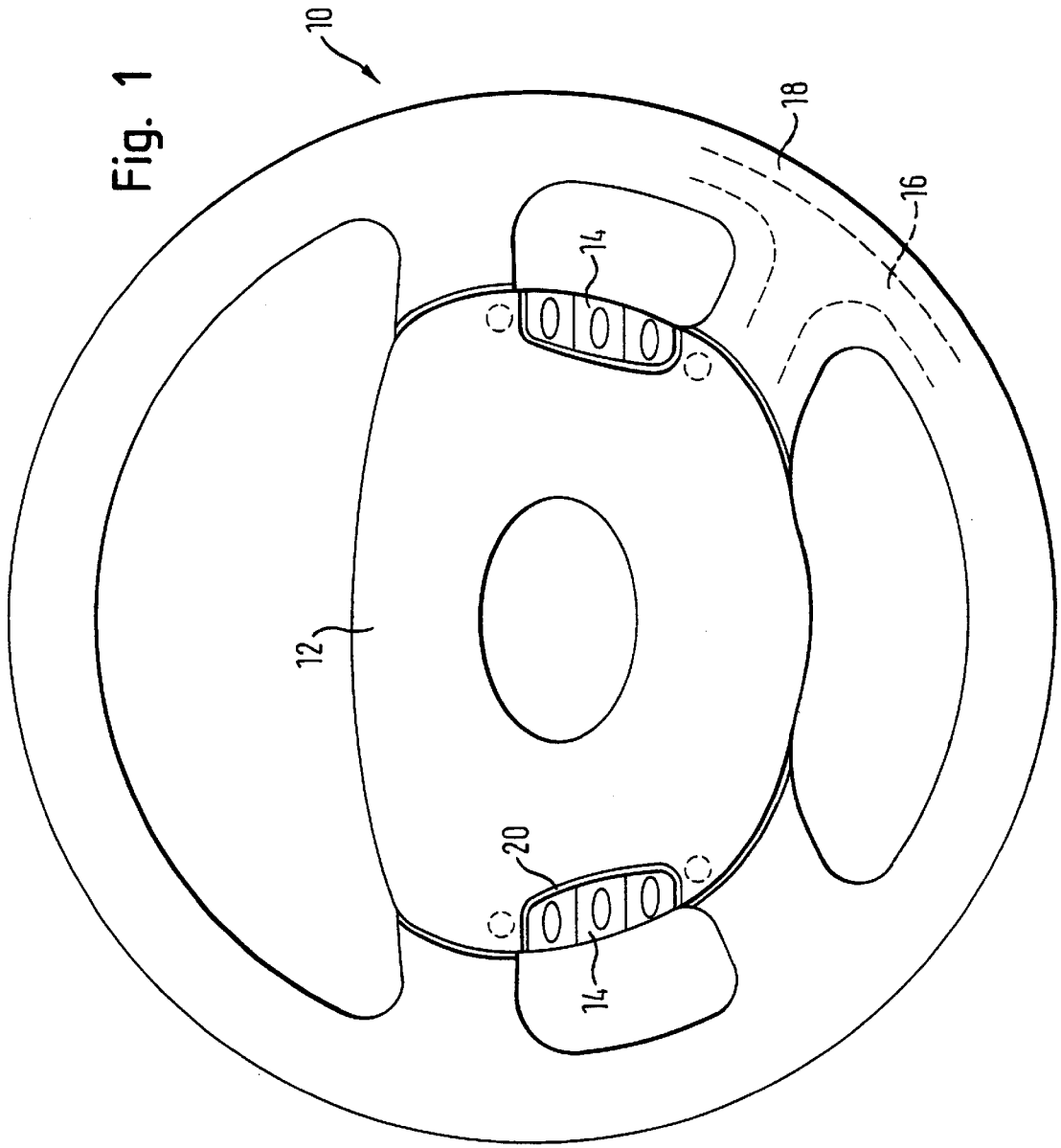
FIG. 1 shows a top view onto a vehicle steering wheel according to the invention.

In FIG. 1 a vehicle steering wheel is illustrated, which has a steering wheel body 10, a gas bag module 12 and multifunctional switch units 14 on the sides immediately adjoining the gas bag module 12, for actuation of vehicle functions such as radio, telephone, on-board computer and the like. The steering wheel consists of a steering wheel skeleton 16 which is only illustrated in part, and of a foam casing 18. The gas bag module 12 is mounted on the steering wheel body 10 so as to be movable in the axial direction, i.e. in FIG. 1 in the direction perpendicular to the plane of the drawing, so that by pressing and moving the gas bag module 12, a horn contact on the rear face of the module is closed and the horn sounds.

The gas bag module 12 and the two multifunctional switch units 14 sit so close to each other that only a small gap 20 is formed between these parts. In addition, the gas bag module 12 and the multifunctional switch units 14 form a preassembled unit, closed in itself, which in the state shown in FIG. 2 is placed in complete form onto the steering wheel body 10 and is mounted on it.

Figure 2:
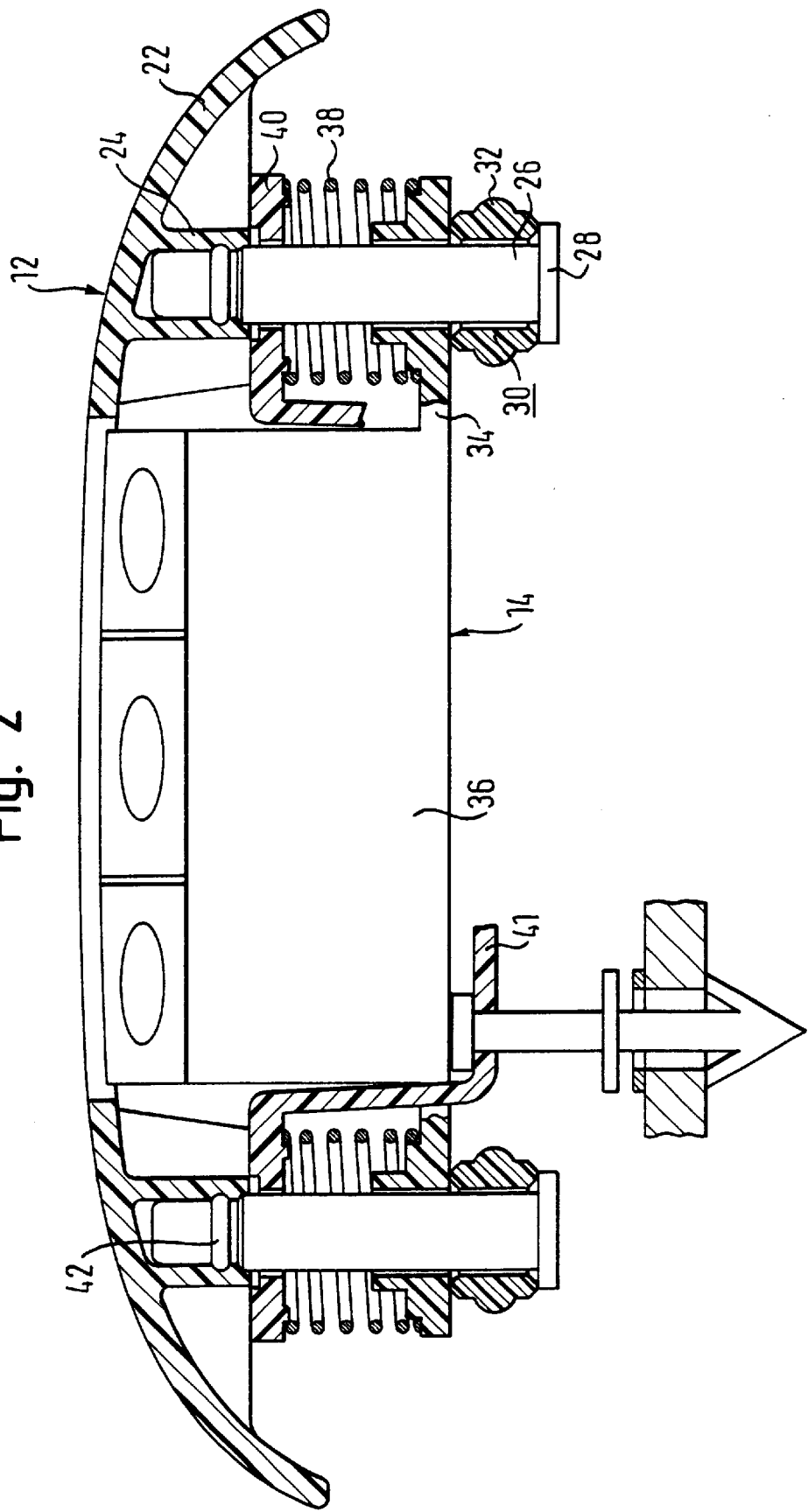
FIG. 2 shows a sectional view through the preassembled unit of FIG. 1, consisting of a module, a multifunctional switch unit and guide pins.

In FIG. 2 it is to be seen that the gas bag module has a covering cap 22 of plastic, projecting from which on the rear face on each side, adjoining the multifunctional switch unit, are sleeve-shaped projections 24. The guide pins 26 for the axial mounting of the gas bag module 12 are pressed into these sleeve-shaped projections 24. The guide pins 26 have at their free end, which is not pressed in, a laterally protruding collar which acts as a stop 28 as long as the module is not installed into the steering wheel, i.e. after assembling the module. Arranged on the guide pins 26, adjoining the stop 28, are plastic bearing bushes 30 which have radially outer annular extensions 32. Arranged in addition on the guide pins, between the projections 24 and the bearing bushes 30, are ear-like projections 34 of the housing 36 of the multifunctional switch unit 14, compression springs 38 and bearing rings 40 for the springs 38. A cup-shaped holding piece 41 to receive the module 12 can be optionally fastened on the bearing rings 40. The guide pins 26 can also be constructed in one piece with the holding piece 41.

Through the fact that the guide pins 26 are pressed into the projections 24 and that these pins, by means of annular shoulders 42 on their outer periphery, are also prevented in a form-fitting manner from leaving the projections 24, every two guide pins 26 associated with one multifunctional switch unit 14, hold the multifunctional switch units 14 on the module 12 to form the preassembled unit.

The springs 38 are arranged with regard to their action between the pressed-in end of the pins 26 and hence between the module and the multifunctional switch unit 14, and press the multifunctional switch units 14 into the subsequent mounting position, i.e. downwards. Nevertheless, owing to the displaceability of multifunctional switch units 14 and of the module 12 in relation to each other, the multifunctional switch units and the module are uncoupled in axial direction with regard to movement. In radial direction, on the other hand, the multifunctional switch units 14 and the module 12 are firmly connected with each other via the guide pins 26, so that only a small gap 20 results, which is also always constant irrespective of the axial position of the multifunctional units 14 and the module 12 with respect to each other, because these parts are arranged on the same guide.

As can be seen, the preassembled unit illustrated in FIG. 2 does not have any support sheets or the like, and the unit also does not necessarily have to be mounted onto a fixed support sheet on the steering wheel body 10.

For the installation itself, the unit shown in FIG. 2 is pressed from above downwards onto the steering wheel body 10. Receptacles 43 for the guide pins 26 together with their bearing bushes 30 are formed in the foam casing. Recesses complementary to the bead 32 are likewise present, in order to achieve, after the pressing in, a form fit between the bearing bushes 30 and the surrounding foam 18. Projecting from the underside of the module are snap hooks 45, which on installation pass through openings 44 in the hub of the steering wheel skeleton 16 and then latch into place, so that a snap connection is formed (see FIG. 3). The snap hooks 45 form, at the same time, an axial stop for the module, because the springs endeavor to press the module upwards. So that—for the initial position shown in FIG. 3, in which no horn actuation is yet present—the snap hooks 45 also act as axial stops for the module, the stops 28, contrary to the non-installed situation in FIG. 2, are spaced apart axially from the bearing bushes 30. The springs 38 not only press the module 12 upwards, but they also press the multifunctional switch units 14 downwards into the mounted final position, in which the multifunctional switch units lie against the bearing bushes 30 and/or the steering wheel body 10.

Figure 3:
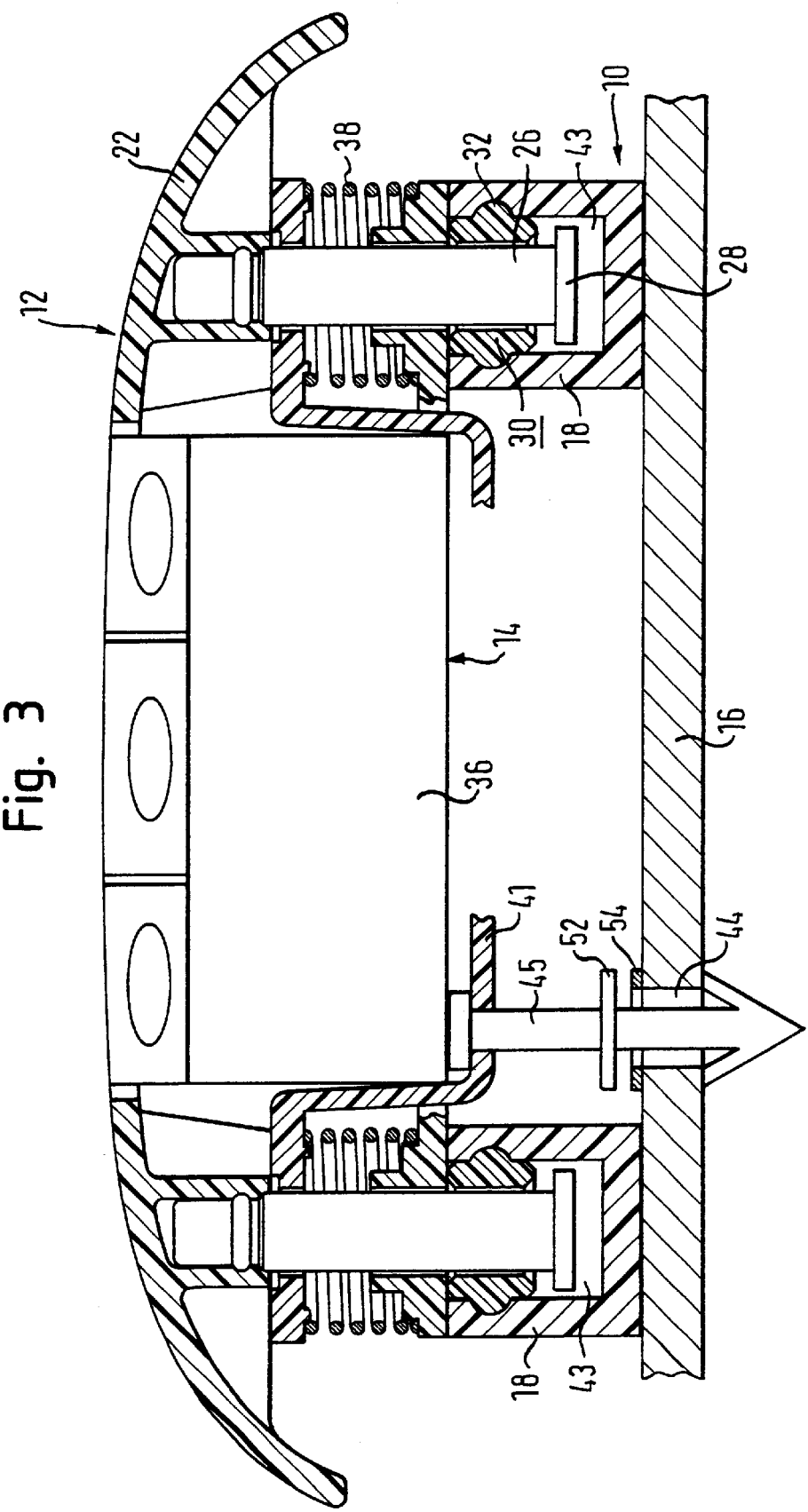
FIG. 3 shows a section through the vehicle steering wheel with the unit of FIG. 2 installed and the horn being not actuated.

Through this defined position of the multifunctional switch units 14, even on application of a downwardly-directed pressure onto the multifunctional switch units 14, with regard to FIG. 3, an inadvertent contacting of the horn contacts 52, 54 can not occur.

On pressing of the module 12 downwards to actuate the horn, the module 12 must be pressed downwards against the force of the springs 38 (see FIG. 4). The springs 38 also serve to restore the module into the initial position shown in FIG. 3, so that on the rear face of the module, apart from the guide pins 26 and the hooks 45, no hitherto usual receptacles have to be provided for the mounting of restoring springs. Therefore, the axial overall space can also be kept small.

After the installation of the module and of the multifunctional switch unit, the stop 28 does not necessarily have to be present in the steering wheel. Also, up until installation, it would be conceivable to manage without the stop 28. For example, the springs 38 could hold the gas bag module and the multifunctional switch unit against each other.

Alternatively, the bearing bushes 30 could also be formed by the multifunctional switch unit.

On the other hand, with a steering wheel without gas bag module, the snap connection could be readily omitted, so that its characteristics are only achieved by the stop 28.

What is claimed is:

1. A vehicle steering wheel, comprising
   a steering wheel body,
   a gas bag module provided with two or more guide pins, said gas bag module for actuation of a horn being mounted displaceably in an axial direction by means of said guide pins, and
   at least one multifunctional switch unit for the remote actuation of specific vehicle functions,
   said at least one multifunctional switch unit being mounted on said guide pins of said gas bag module so as to be movable in said axial direction independently of said gas bag module.

2. The vehicle steering wheel according to claim 1, wherein said gas bag module and said multifunctional switch unit form a preassembled unit.

3. The vehicle steering wheel according to claim 2, wherein said gas bag module and said multifunctional switch unit are connected with each other via said guide pins so as to form a preassembled unit.

4. The vehicle steering wheel according to claim 1, wherein at least one spring is provided which urges said multifunctional switch unit into a mounting position.

5. The vehicle steering wheel according to claim 4, wherein said spring is arranged between said gas bag module and said multifunctional switch unit.

6. The vehicle steering wheel according to claim 4, wherein said spring is arranged such that it exerts a force for restoring said gas bag module after said actuation of said horn has taken place.

7. The vehicle steering wheel according to claim 4, wherein each of said guide pins is provided with an associated spring and extends through said spring.

8. The vehicle steering wheel according to claim 1, wherein said guide pins are fastened in said gas bag module and have a stop provided remotely from said gas bag module, said multifunctional switch unit being displaceably mounted on said guide pins between said gas bag module and said stop.

9. The vehicle steering wheel according to claim 1, wherein said gas bag module and said multifunctional switch unit are connected with each other by said guide pins so as to form a preassembled unit and wherein bearing bushes are arranged on said guide pins, which bearing bushes are pressed into receptacles in said steering wheel body during mounting said preassembled unit into position.

10. The vehicle steering wheel according to claim 1, wherein a snap connection is provided between said gas bag module and said steering wheel body as an axial stop of said gas bag module, which snap connection defines a basic position of said gas bag module in said axial direction when said horn is not being actuated.

* * * * *